United States Patent [19]

Winslow et al.

[11] Patent Number: 4,774,314
[45] Date of Patent: Sep. 27, 1988

[54] PREPARING POLY(ARYL ETHERS) USING ALKALINE EARTH METAL CARBONATES, ORGANIC ACID SALTS, AND OPTIONALLY COPPER COMPOUNDS, AS CATALYSTS

[75] Inventors: Paul A. Winslow, Millington; Donald R. Kelsey, Hillsborough; Markus Matzner, Edison, all of N.J.

[73] Assignee: Amoco Corporation, Chicago, Ill.

[21] Appl. No.: 37,839

[22] Filed: Apr. 13, 1987

Related U.S. Application Data

[63] Continuation-in-part of Ser. No. 855,596, Apr. 25, 1986.

[51] Int. Cl.$^4$ .................. C08G 65/40; C08G 65/38; C08G 8/02
[52] U.S. Cl. .................. 528/126; 528/212; 528/214; 528/217
[58] Field of Search ........................ 528/126

[56] References Cited

U.S. PATENT DOCUMENTS 4,636,557 1/1987 Deckers .................. 528/126
4,638,044 1/1987 Kelsey .................. 528/126

Primary Examiner—John Kight
Assistant Examiner—Frederick Krass
Attorney, Agent, or Firm—Donald M. Papuga; William H. Magidson; Ralph C. Medhurst

[57] ABSTRACT

Described herein is an improved process for preparing poly(aryl ethers) and poly(aryl ether ketones) by the reaction of a mixture of at least one bisphenol and at least one dihalobenzenoid compound, and/or a halophenol, in which the improvement comprises providing to the reaction medium, a combination of sodium or an alkaline earth metal carbonate and/or bicarbonate and a potassium, rubidium, or cesium salt of an organic acid or combinations of various organic salts thereof. The process yields high molecular weight, linear, poly(aryl ethers) and poly(aryl ether ketones) possessing excellent thermal stability and physical properties.

20 Claims, No Drawings

PREPARING POLY(ARYL ETHERS) USING ALKALINE EARTH METAL CARBONATES, ORGANIC ACID SALTS, AND OPTIONALLY COPPER COMPOUNDS, AS CATALYSTS

REFERENCE TO RELATED APPLICATION

This Application is a continuation-in-part of application Ser. No. 855,596 filed Apr. 25, 1986.

FIELD OF THE INVENTION

A novel process for the preparation of poly(aryl ethers) and poly(aryl ether ketones) is described. The process comprises reacting an activated dihalobenzenoid compound with a diphenol and/or self-condensing a halophenol whose halogen atom is activated towards nucleophilic substitution reactions. The polymerizations are performed at high temperatures, in a aprotic solvent, and in the presence of a base. The base comprises sodium or an alkaline earth metal carbonate or bicarbonate and a potassium, rubidium or cesium salt of an organic acid. In another embodiment, the base comprises sodium or an alkaline earth metal carbonate or bicarbonate and a lithium, sodium or alkaline earth metal salt of an organic acid, optionally in combination with a catalytic amount of a potassium, cesium or rubidium salt catalyst. Moreover, all of the above reactions may be advantageously performed in the presence of small amounts of cupric or cuprous ions. The process yields high molecular weight, linear, poly(aryl ethers) and poly(aryl ether ketones) possessing excellent thermal stability and physical properties. It is remarkable that the reactions proceed at rates that are significantly higher than those of the prior art processes. Moreover, the polymers obtained are substantially free of undesirable gel particles.

BACKGROUND OF THE INVENTION

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involves the electrophilic aromatic substitution (viz. Friedel-Crafts catalyzed) reaction of aromatic diacylhalides with unsubstituted aromatic compounds such as diphenyl ether. The evolution of this calss to a much broader range of PAE's was achieved by Johnson et al., *Journal of Polymer Science*, A-1, Vol. 5, 1967, pp. 2415–2427; Johnson et al., U.S. Pat. Nos. 4,108,837 and 4,175,175. Johnson et al. show that a very broad range of PAE's can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK's".

In recent years, there has developed a growing interest in PAEK's as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Attwood et al., *Polymer*, 1981, Vol. 22, August, pp. 1096–1103; Blundell et al., *Polymer*, 1983, Vol. 24, August, pp. 953–958; Attwood et al., *Polymer Preprints*, 20, No. 1, April 1979, pp. 191–194; and Rueda et al., *Polymer Communications*, 1983, Vol. 24, September, pp. 258–260. In PAEK under the trademark Victrex PEEK. As PAEK is the acronym of poly(aryl ether ketone), PEEK is the acronym of poly(ether ether ketone) in which the phenylene units in the structure are assumed.

Thus PAEK's are well known; they can be synthesized from a variety of starting materials; and they can be made with different melting temperatures and molecular weights. Most of the PAEK's are cystalline and at sufficiently high molecular weights, they are tough, i.e., they exhibit high values ($>50$ ft-lbs/in$^3$) in the tensile impact test (ASTM D-1822). They have potential for a wide variety of uses, and their favorable properties class them with the best of the engineering polymers.

Some PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes tend to be brittle and thermally unstable. In contrast, PAEK's made by nucleophilic aromatic substitution reactions are tough crystalline polymers. Nucleophilic aromatic substitution reactions for producing PAEK's are described in the following references:

Canadian Pat. No. 847,963 describes a process for preparing polyarylene polyethers. The process comprises contacting equimolar amounts of a dihydric phenol and a dihalobenzenoid compound and at least one mole of an alkali metal carbonate per mole of dihydric phenol. The dihydric phenol is in situ reacted with the alkali metal carbonate to form the alkali metal salt thereof and the formed salt reacts with the dihalobenzeoid compound tp form the polyarylene polyether in the usual fashion.

U.S. Pat. No. 4,176,222 describes the preparation of aromatic polyethers containing SO$_2$ and/or CO linkages by a nucleophilic reaction utilizing a mixture of sodium carbonate or bicarbonate and a second alkali metal carbonate or bicarbonate. The alkali metal of the second alkali metal carbonate or bicarbonate has a higher atomic number than that of sodium. The second alkali metal carbonate or bicarbonate is used in amounts such that there are 0.001 to 0.2 gram atoms of the alkali metal of higher atomic number per gram atom of sodium. The process is stated to take place faster when the combination of sodium carbonate or bicarbonate and the second alkali metal carbonate or bicarbonate are used. Also, the products are stated to be of higher molecular weight using such a combination.

The patent describes in Example 17 that when the reaction is carried out using only sodium carbonate, a polymer is obtained having a reduced viscosity of 0.60 dl/g as measured in concentrated sulfuric acid at 25° C. at a concentration of one gm/100 ml. However, it is stated in the patent that when the polymer was compression molded into a film, the film was brittle and dark grey in color. In Example 18 of the patent, the polymerization was carried out using potassium carbonate instead of sodium carbonate and a high molecular weight polymer was produced (reduced viscosity of 1.55 as measured in concentrated sulfuric acid at 25° C. at a concentration of one gm/100 ml.). However, the polymer was stated to contain a quantity of gel and also, the reaction vessel had acquired a black coating. In Example 19 of the patent, a mixture of potassium carbonate and sodium carbonate was used. The patent stated that the polymer produced has a high reduced viscosity and a tough off-white film was formed from it.

Also, no gel was present in the polymer and the reaction vessel had not become discolored.

U.S. Pat. No. 4,320,224 also describes the production of aromatic polyetherketones in the presence of an alkali metal carbonate or bicarbonate in an amount providing at least 2 gram atoms of alkali metal per mole of starting bisphenol. The patent states that the sole use of sodium carbonate and/or bicarbonate is excluded.

U.S. Pat. No. 3,941,748 describes the use of alkali metal fluoride for preparing polyarylethers. The process requires that sufficient fluoride be present so that the total fluoride available (including that from any fluoroaryl monomers) can be at least twice the number of phenol (—OH) groups. The examples show it to be, in general, a slow process.

Imai, et al., in *Makromol Chem.*, 179, pp. 2989-2991, 1978 describe the preparation of polysulfones in dipolar aprotic solvents using at least 500 mole percent of potassium fluoride based on the bisphenol. The process uses relatively low temperatures (about 100 C) to avoid polymer degradation but requires very long reaction times (48-70 hours).

U.S. Pat. No. 4,169,178 refers to the British counterpart of U.S. Pat. No. 3,941,748, i.e., British Pat. No. 1,348,630. The patent states that the amount of alkali metal carbonate required may be reduced in the preparation of aromatic polyethers by employing fluorophenols or difluorobenzenoid compounds as part or all of the halogen containing reactants. The patent states that the process gives faster reactions and higher molecular weights and less colored polymers than a process using potassium fluoride in place of potassium carbonate.

German Patent Application No. 3,342,433 describes a process for the preparation of aromatic polyethers which uses a mixture of (a) a lithium and/or an alkaline earth metal carbonate; and (b) a sodium, potassium, ribidium, and/or a cesium carbonate. The patent application states that it was totally unexpected to discover that high molecular weight polymers can be prepared via the nucleophilic polycondensation, if one uses the combination of the essentially non-reactive carbonates selected from the group of lithium or alkaline earth metal carbonates, with small amounts, that are per se insufficient to perform a successful polymerization, of a carbonate selected from the group of sodium, potassium, rubidium, or cesium carbonates.

European Patent Application No. 182,648 discloses a process for the preparation of an aromatic polymer which comprises (a) effecting the condensation of at least one halophenol; or (b) effecting the condensation of a mixture of at least one bisphenol with at least one dihalo-benzenoid compound; or (c) effecting the condensation of (i) at least one halophenol and (ii) a mixture of at least one bisphenol with at least one dihalo-benzenoid compound, in the presence of at least a base and at least one copper compound, wherein the base is in stoichiometric excess relative to the phenolic groups in (a), (b), or (c), at least one of the compounds in (a), (b), or (c) being a compound containing a ketone group, and in the halophenol or the dihalo-benzenoid compound the, or each halogen atom being activated by an inert electron-withdrawing group in at least one of the positions ortho- or para- to the, or each, halogen atom. The patent application states that polymers of increased molecular weight, as indicated by inherent viscosity, may be obtained from chlorine or bromine-containing monomers or a polymer of the same molecular weight may be obtained using a shorter polymerization time. Alkali metal hydroxides, carbonates or bicarbonates are cited as useful bases.

U.S. Pat. No. 4,638,044 describes the use of sodium carbonate or bicarbonate and an alkali metal halide selected from potassium, rubidium, or cesium fluoride or chloride, or combinations thereof. This process represents a significant improvement over the prior art. It, however, still makes use of relatively high amounts of fluoride salts which are corrosive; moreover, the rates of polymerization are relatively low when compared to those of the instant invention.

THE INVENTION

This invention is directed to a process for making high molecular weight poly(aryl ethers) and poly(aryl ether ketones) in comparatively shorter reaction times overall than by using a combination of sodium carbonate or bicarbonate and a second higher alkali metal carbonate or bicarbonate, or by using a mixture of sodium carbonate or bicarbonate and a potassium, rubidium, or cesium fluoride or chloride or combinations thereof, or by using a lithium and/or alkaline earth metal carbonate and a sodium, potassium, rubidium and/or cesium carbonate.

Specifically, the invention is directed to an improved process for preparing poly(aryl ethers) and poly(aryl ether ketones) by the reaction of a mixture of at least one bisphenol and at least one dihalobenzenoid compound, and/or a halophenol, in which the improvement comprises providing to the reaction medium, a combination of sodium or an alkaline earth metal carbonate and/or bicarbonate and a potassium, rubidium, or cesium salt of an organic acid or combinations of various organic salts thereof. It is to be noted that in the text that follows the three metals, i.e. potassium, rubidium or cesium are often referred to as higher alkali metals.

In another embodiment, the invention is directed to an improved process for preparing poly(aryl ethers) and poly(aryl ether ketones) by the reaction of a mixture of at least one bisphenol and at least one dihalobenzenoid compound, and/or a halophenol, in which the improvement comprises providing to the reaction medium a combination of sodium or an alkaline earth metal carbonate and/or bicarbonate and a lithium, sodium, or alkaline earth metal salt of an organic acid. In addition, this latter reaction can be catalyzed by the addition of a catalytic amount of a potassium, cesium, or rubidium salt catalyst. In this latter embodiment the process either does not make use at all of any added higher alkali metal compound (or compounds), contrary to the teaching in the prior art; or the process utilizes only catalytic amounts of higher alkali metal compounds which are substantially more effective than when used in prior art processes.

Moreover, all of the above variants may be advantageously performed in the presence of a small amount of cupric or cuprous ions.

The process of this invention yields high molecular weight, linear, poly(aryl ethers) and poly(aryl ether ketones) possessing excellent thermal stability and physical properties. It is remarkable that the reactions proceed at rates that are significantly higher than those of the prior art processes. It is even more remarkable that these high reaction rates can be achieved in the presence of catalytic amounts of higher alkali metal salts. Furthermore, it is remarkable that high molecular weight polymers can be prepared even in the absence of added higher alkali metal salts. Moreover, the polymers obtained are relatively free of undesirable gel particles.

The poly(aryl ether) polymers suitable for the purposes of this invention are linear thermoplastic polyarylene polyethers containing recurring units of the formula:

—O—E—O—E'— wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms. Such atomatic polyethers are included within the class of polyarylene polyether resins described in, for example, U.S. Pat. Nos. 3,264,536 and 4,175,175. It is preferred that the dihydric phenol be a weakly acidic dinuclear phenol such as, for example, the dihydroxy diphenyl alkanes or the nuclear halogenated derivatives thereof, such as for example, the 2,2-bis(4-hydroxyphenyl)propane, 1,1-bis(4-hydroxyphenyl)-2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as for example, ether oxygen (—O—),

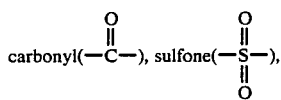

or hydrocarbon residue in which the two phenolic nuclei are joined to the same or different carbon atoms of the residue.

Such dinuclear phenols can be characterized as having the structure:

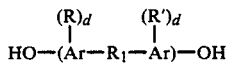

wherein Ar is an aromatic group and preferably is a phenylene group, R and R' can be the same or different inert substituent groups such as alkyl groups having from 1 to 4 carbon atoms, aryl, halogen atoms, i.e., fluorine, chlorine, bromine or iodine, or akoxyl radicals having from 1 to 4 carbon atoms, the d's are independently integers having a value of from 0 to 4, inclusive, and $R_1$ is representative of a bond between aromatic carbon atoms as in dihydroxyl-diphenyl, or is a divalent radical, including for example, radicals such as

—O—, —S—, —S—S— —SO—, —SO$_2$, and divalent hydrocarbon radicals such as alkylene, alkylidene, cycloalkylene, cycloalkylidene, or the halogen, alkyl, aryl, or like substituted alkylene, alkylidene or cycloaliphatic radicals as well as aromatic radicals and radicals fused to both Ar groups.

Examples of specific dihydric polynuclear phenols include among others:

the bis-(hydroxyaryl) alkanes such as
2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane
2,2-bis-(2-isopropyl-4-hydroxyphenyl)propane
2,2-bis-(4-hydroxynaphthyl)propane
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydorxyphenyl)1,1,1,3,3,3,-hexafluoropropane and the like;
di(hydroxyaryl) sulfones such as
bis-(4-hydroxyphenyl)sulfone,
2,4'-dihydroxydiphenyl sulfone,
5-chloro-2,4'-dihydroxydiphenyl sulfone,
5-chloro-4,4'-dihydroxydiphenyl sulfone, and the like;
di(hydroxyaryl)ethers such as
bis-(4-hydroxyphenyl)ether,
the 4,3'-, 4,2'-, 2,2'-, 2,3'-dihydroxyphenyl ethers,
4,4'-dihydroxy-2,6-dimethyldiphenyl ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronapthyl)ether, and
4,4'-dihydroxy-3,6-dimethoxydiphenyl ether.

As herein used, the E term is defined as being the "residuum of the dihydric phenol" of course refers to the residue of the dihydric phenol after the removal of the two aromatic hydroxyl groups. Thus, as is readily seen, these polyarylene polyethers contain recurring groups of the residuum of the dihydric phenol and the residuum of the benzenoid compound bonded through aromatic ether oxygen atoms.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho or para to the halogen or nitro group. The dihalobenzenoid or dinitrobenzenoid compound can be either mononuclear, where the halogens or nitro groups are attached to the same benzenoid ring; or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about one percent and preferably below 0.5 percent for best results.

An electron withdrawing group is employed as the activator group in these compounds. It should be, of course, inert under the reaction conditions, but otherwise its structure is not critical. Preferred are the strongly activating groups such as the sulfone group

bonding two halogen or nitro substituted benzenoid nuclei, as in 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating groups can be basically either of two types:
(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.
(b) divalent groups which can activate displacement of halogens on two different rings, such as the sulfone group

the carbonyl group

the vinylene group

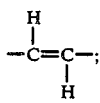

the sulfoxide group

the azo group —N=N—; the saturated fluorocarbon groups

—CF$_2$—CF$_2$CF$_2$; organic phosphine oxides

where R''$_3$ is a hydrocarbon group and the ethylidene group

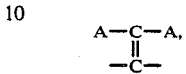

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same of different.

It is seen also that as used herein, the E' term defined as being the "residuum of the benzenoid compound" refers to the aromatic or benzenoid residue of the compound after the removal of the halogen atom or nitro group on the benzenoid nucleus.

Preferred polyarylene polyethers of this invention are those prepared using the dihydric polynuclear phenols of the formulae (1)–(5) including the derivatives thereof which are substituted with inert substituent groups;

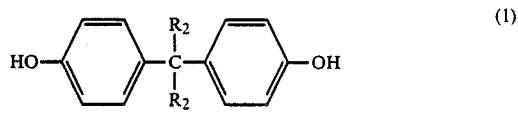

(1)

in which the R$_2$ groups represent independently hydrogen, lower alkyl, aryl and the halogen substituted groups thereof, which can be the same or different;

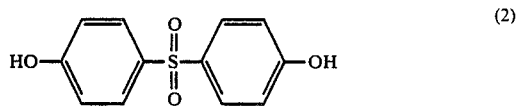

(2)

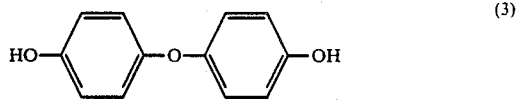

(3)

(4)

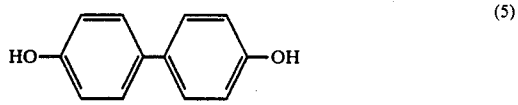

(5)

and substituted derivatives thereof.

It is also contemplated in this invention to use a mixture of two or more different dihydric phenols to accomplish the same ends as above. Thus, when referred to above, the -E- residuum in the polymer structure can actually be the same or different aromatic residua.

The preferred dihalobenzenoid compounds are (6), (7), (8), and (9); they may carry inert substituent groups.

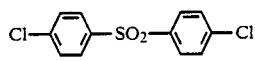 (6)

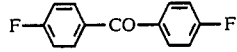 (7)

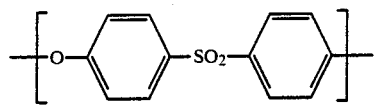 (9)

The most preferred poly(aryl ether) polymers have the repeating units (10), (11), (12), and (13).

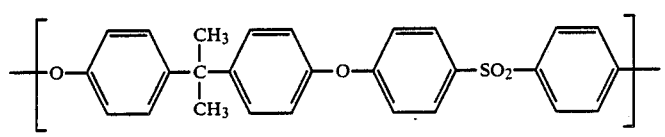 (10)

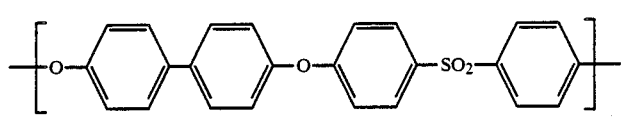 (11)

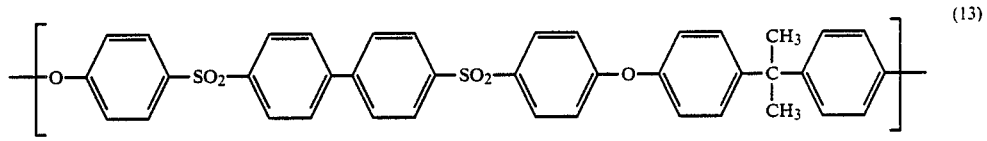 (12)

(13)

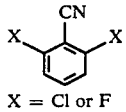 (8)

X = Cl or F

The poly(aryl ether ketones) of this invention are characterized as including oligomers, polymers, and copolymers containing repeating units of ether oxygen and keto(carbonyl) interconnected by aromatic diradicals, such as 1,4-phenylene. They may be characterized more specifically by one or more of the following formulae:

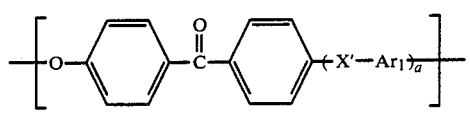 (I)

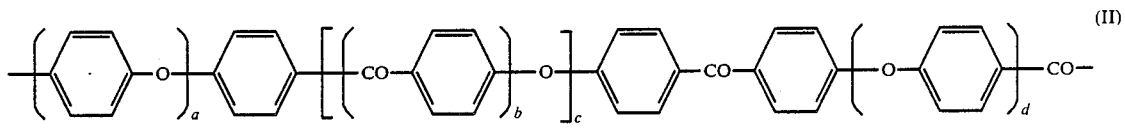 (II)

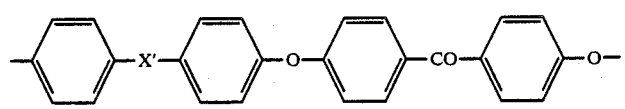 (III)

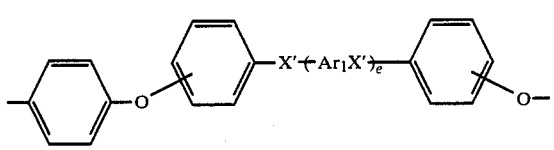 (IV)

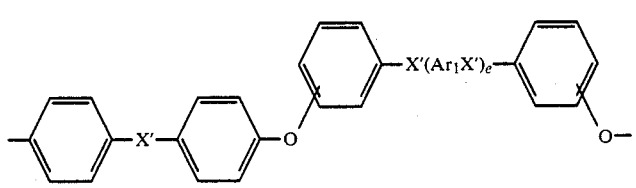 (V)

wherein $Ar_1$ is independently a divalent aromatic radical selected from phenylene, biphenylene, or naphthylene, X' is independently O, $SO_2$, or a direct bond, and a is an integer of from 1 to 4; b, c, d and e are 0 to 1 and preferably d is 0 when b is 1.

Preferred poly(aryl ether ketones) include those having repeating units of the formula:

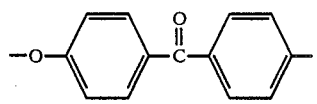

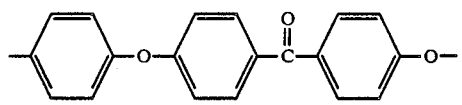

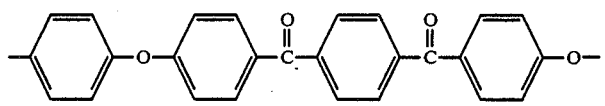

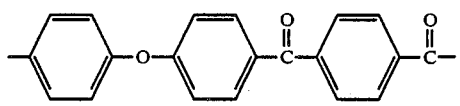

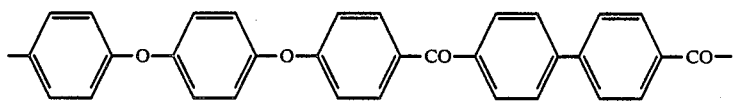

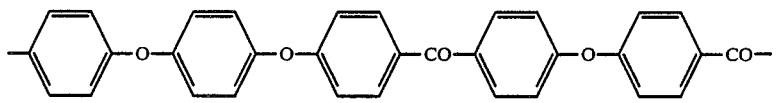

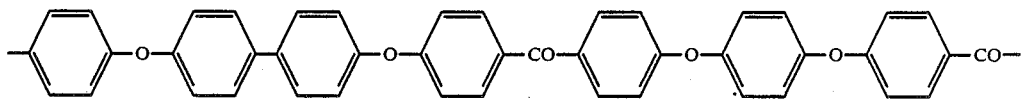

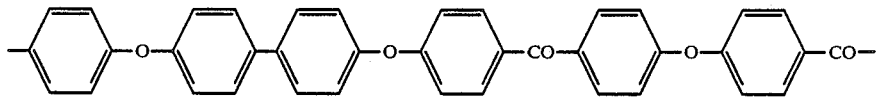

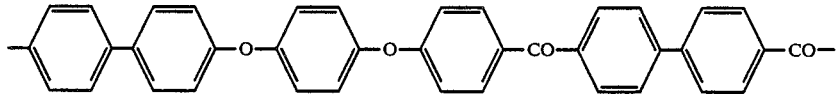

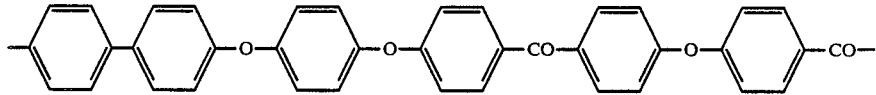

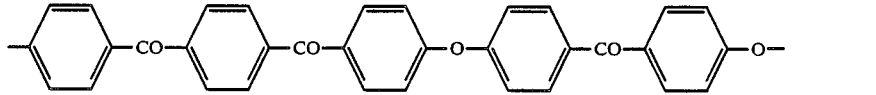

The preferred poly(aryl ether ketones) may form copolymers with the following:

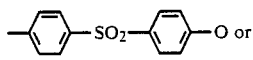 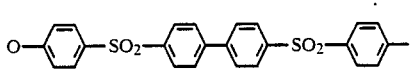

The process is conducted by reacting a mixture (substantially equimolar amounts when maximum molecular weight is sought) of at least one bisphenol and at least one dihalobenzenoid compound and/or a halophenol. The poly(aryl ethers) are prepared by condensing the bisphenols and dihalo- or dinitrobenzenoid compounds listed above. Halophenols (vide infra) may also be used. The bisphenols useful for the preparation of the poly(aryl ether ketones) may be depicted as follows:

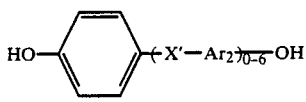

wherein the X's can be independently O,

$SO_2$, or a direct bond and the $Ar_2$'s can be independently a divalent radical selected from phenylene, biphenylene or naphthylene, most preferably 1,4-phenylene.

The dihalobenzenoid compounds useful for the preparation of poly(aryl ether ketones) may be depicted as follows:

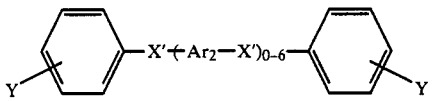

wherein Y is halogen, preferably fluorine or chlorine, the Y's may be the same or different and are ortho or para to the X'; $Ar_2$ and X' are as defined above with the proviso that the X's ortho or para to the Y's are electron withdrawing groups, i.e.,

or $SO_2$. In the preferred embodiment, each aromatic radical is para substituted and most preferably, 1,4-phenylene.

The useful halophenols may be depicted as follows:

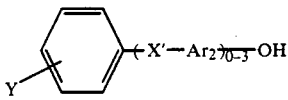

wherein Y, X', and $Ar_2$ are as defined above with the proviso that the X's ortho or para to Y are electron-withdrawing groups, i.e.,

or $SO_2$.

Preferred bisphenols include:
hydroquinone,
4,4'-dihydroxybenzophenone,
4,4'-dihydroxybiphenyl,
4,4'-dihydroxydiphenyl ether,
4,4'-dihydroxydiphenyl sulfone,
4,4'-bis(p-hydroxybenzoyl)biphenyl,
1,4-bis(p-hydroxybenzoyl)benzene, and
4,4'-bis(4-hydroxyphenylsulfonyl)biphenyl.

Preferred dihalobenzenoid and halophenol compounds include:
4-(4'-chlorobenzoyl)phenol,
4-(4'-fluorobenzoyl)phenol,
4,4'-difluorobenzophenone,
4,4'-dichlorobenzophenone,
4-chloro-4'-fluorobenzophenone,
1,4-bis(4'-fluorobenzoyl)benzene,
1,3-bis(4'-fluorobenzoyl)benzene,
4,4'-dichlorodiphenyl sulfone,
4,4'-bis(p-halobenzoyl)biphenyl,
4,4'-difluorodiphenyl sulfone, and
4-chloro-4'-hydroxydiphenyl sulfone.

According to the invention, the polymerizations are performed in the presence of a base which is composed of sodium or alkaline earth metal carbonate or bicarbonate and of a potassium, rubidium, or cesium salt of an organic acid. Salts of any organic acid are useful. Thus, one may use the potassium, rubidium, or cesium salts of aliphatic linear or branched acids such as formic, acetic, propionic, butyric, isobutyric, pentanoic, hexanoic, heptanoic, octanoic, nonanoic, decanoic, 2-methyl-butyric, 3,4-dimethyl-pentanoic, 4,4-dimethyl hexanoic, 2-ethyl-heptanoic, 3-propyl-5,6-dimethyl nonanoic and other similar acids.

Salts of halo-substituted aliphatic acids such as
monochloro-, dichloro-, and trichloroacetic, 2-chloropropionic, 3,5-dichloroheptanoic, bromoacetic, 3-fluorobutyric, and 3,3,3-trichloropropionic acids.

Salts of aromatic mono- or polynuclear acids such as
benzoic, toluic, 3,4-dimethylbenzoic, 2-chlorobenzoic, 3,4-dichlorobenzoic, 2-bromobenzoic, 2-chloro-4-methylbenzoic, 2-fluoro-3-ethylbenzoic,
other alkyl and/or halo-substituted benzoic acids, the naphthalene carboxylic acids, alkyl-substituted naphthalene carboxylic acids such as 3-methyl-naphthalene-1-carboxylic acid, 6-ethyl-naphthalene-2-carboxylic acid. halo-substituted naphthalene carboxylic acids such as 4-chloro-naphthalene-2-carboxylic acid, phenanthrene and anthracene carboxylic acids and the like.

Salts of arylaliphatic acids such as
phenylacetic, diphenyl acetic, 1-naphthyl acetic, 2-naphthyl-acetic, 4-chlorophenyl acetic, 4-methylphenyl acetic, 3-bromo-1-naphthyl acetic, 4-chloro-2-naphthyl-acetic, 3-(6-chloro-1-naphthyl)propionic, 3-(4-ethylphenyl)butyric, 3-methyl-4-(2-ethyl-4-chlorophenyl)butyric, 3-phenyl-hexanoic, and 7-phenylnonanoic acids.

Salts of heterocyclic carboxylic acids such as
furane-2-carboxylic, furane-3-carboxylic, thiophene-2-carboxylic, thiophene-3-carboxylic, the pyridine, quinoline and isoquinoline carboxylic acids.

Salts of alkyl, aryl, and halo-substituted heterocyclic acids such as
2-methylfurane-3-carboxylic,
4-chloro-pyridine-2-carboxylic,
2-methyl-4-oxazole carboxylic, and
2-propyl-pyrazine-3-carboxylic acids.

Salts of dicarboxylic acids such as
oxalic, malonic, succinic, adipic, suberic, azelaic, α-bromo-glutaric, β,β'-dimethyl-glutaric, α,α'-dichlorosuberic, maleic, and fumaric acids.

Salts of aromatic and heterocyclic dicarboxylic acids such as
phthalic, isophthalic, terephthalic,
naphthalene-1,2-dicarboxylic,
naphthalene-2,3-dicarboxylic,
naphthalene-1,5; 1,6; 1,7; 1,8; 2,4; 2,5; and 2,6-dicarboxylic,
pyridine-2,3-dicarboxylic,
furane-2,3-dicarboxylic acids and the like.

Salts of aliphatic, aromatic, and heterocyclic sulfonic and sulfinic acids such as
methane sulfonic, ethane sulfonic, propane sulfonic,
benzene sulfonic, benzene sulfinic,
1-naphthalene sulfonic,
2-naphthalene sulfonic,
1-naphthalene sulfinic,
1,8-naphthalene disulfonic,
2,6-naphthalene disulfonic,
4-methyl-benzene sulfinic,
p-toluene sulfonic,
3,4-dichloro-benzene sulfonic,
6-chloro-naphthalene-1-sulfonic,
quinoline-2-sulfonic,
4-pyridine sulfonic,
2-thiophene sulfonic,
3-thiophene sulfonic,
3-methyl-2-furane sulfinic,
3-propyl-2-furane-sulfonic acids and the like.

Salts of aliphatic, aromatic, and heterocyclic phosphonic and phosphinic acids such as
methane phosphonic, ethane phosphonic,
benzene phosphinic, benzene phosphonic,
1-naphthalene phosphonic,
2-naphthalene phosphonic,
1-naphthalene phosphinic,
1,8-naphthalene diphosphonic,
2,6-naphthalene diphosphonic,
4-methyl-benzene phosphinic,
4-ethyl-benzene phosphonic,
3,4-dichloro-benzene phosphonic,
3,4-dibromobenzene phosphonic,
3-chloro-4-methyl benzene phosphonic,
6-chloro-1-naphthalene phosphonic,
2-quinoline phosphonic,
2-thiophene phosphonic,
3-thiophene phosphonic,
3-thiophene phosphinic,
3-chloro-2-furane phosphinic,
3-propyl-2-furane phosphonic acids and the like.

Mixed salts such as for example mixtures of potassium and rubidium acetates or mixtures of potassium acetate and potassium benzene sulfonate and the like can also be used. The preferred salts are potassium formate, acetate, propionate, oxalate, benzoate, benzene sulfonate and p-toluene sulfonate.

The sodium or alkaline earth metal carbonate or bicarbonate and the potassium, rubidium, or cesium organic salt are used such that the ratio of the higher alkali metal to sodium or alkaline earth metal therein is from about 0.001 to about 0.5, preferably from about 0.001 to about 0.20, and most preferably from 0.01 to about 0.1.

In another preferred embodiment, from 0.001 to about 0.5 atoms of alkali metal (derived from the alkali metal organic salt) is used for each phenol group. Of course, it is well known to those skilled in the art that cesium is a more active metal and potassium is a less active metal, so that less cesium and more potassium are used. It is preferred that the ratio of carbonate and bicarbonate anions to the phenolic groups be about 0.5 to 1.0, respectively. However, higher and lower ratios are also possible.

In another embodiment, this invention is directed to an improved process for preparing poly(aryl ethers) and poly(aryl ether ketones) by the reaction of a mixture of at least one bisphenol and at least one dihalobenzenoid compound, and/or a halophenol in the presence of a combination of sodium or alkaline earth metal carbonate or bicarbonate and a lithium, sodium, or alkaline earth metal salt of an organic acid and substantially in the absence of higher alkali metal salts. The salts of organic acids that are useful are the same as those listed above. Preferred salts are the formates, acetates, propanoates, benzoates, benzene sulfonates and p-toluene sulfonates. Sodium salts are most preferred.

The polycondensation is preferably conducted in the presence of an essentially stoichiometric amount of sodium or alkaline earth metal carbonate or sodium or alkaline earth metal bicarbonate, i.e., the ratio of carbonate and bicarbonate anions to the phenolic groups should be about 0.5 and 1.0, respectively. However, a deficiency or an excess of carbonate or bicarbonate can also be used; the amount of the lithium, sodium, or alkaline earth metal salt is in the range of from about 0.01 to about 0.5 moles per mole equivalent of sodium or alkaline earth metal carbonate or bicarbonate; and preferably from about 0.02 to about 0.3 moles per mole equivalent. The amount of the lithium, sodium, or alkaline earth metal salt can be adjusted to obtain the desired reaction rate and, hence, these salts may be used in amounts greater or lesser than the ranges stated herein.

This latter polymerization can be catalyzed by the addition of a catalytic amount of a potassium, cesium or rubidium salt. In this process variation, the polycondensation of a bisphenol with a dihaloaromatic monomer (and/or the polycondensation of a halophenol) is, once again, conducted in the presence of an essentially stoichiometric amount of sodium or alkaline earth metal carbonate or bicarbonate, although a deficiency or an excess of carbonate or bicarbonate can be used. The amount of the lithium, sodium, or alkaline earth metal salt is from about 0.005 to about 0.5 moles per mole equivalent of sodium or alkaline earth metal carbonate or bicarbonate; and preferably from about 0.01 to about 0.2 moles per mole equivalent. The amount of the higher alkali metal salt catalyst is from about 0.00001 to about 0.05 gram-atom of the higher alkali metal per mole equivalent of sodium or alkaline earth metal carbonate or bicarbonate; and such that the ratio of gram-atoms of the higher alkali metal to the mole equivalent of the lithium, sodium, or alkaline earth metal salt is less than one. Where the preferred amount of the lithium, sodium, or alkaline earth metal salt is used, it is preferred to employ from about 0.00002 to about 0.01 gram-atoms of the higher alkali metal per mole equivalent of sodium or alkaline earth metal carbonate or bicarbonate. The gram-atom ratio of the higher alkali metals to the combined total gram equivalents of lithium, sodium and alkaline earth metal, (carbonate, bicarbonate, and organic salt) should be less than about 0.05, preferably less than about 0.005, and most preferably less than about 0.001.

The amount of the lithium, sodium or alkaline earth metal salt and the amount of the higher alkali metal salt catalyst can be adjusted separately or simultaneously to obtain the desired reaction rate and, hence, these salts may be used in amounts greater or lesser than the ranges stated above.

The lithium, sodium, or alkaline earth metal salts of organic acids that are useful are the same as those listed above. Preferred salts are the formates, acetates, propanoates, benzoates, benzene sulfonates and p-toluene sulfonates. Sodium salts are most preferred.

The higher alkali metal salt catalysts are of the general formula

MX"

where M is potassium, cesium or rubidium; X" is the residue of an organic acid (vide supra); the residue of an inorganic acid such as carbonate, bicarbonate, halide and the like; the residue of a phenol such as phenoxide, naphthoxide, halo- and/or alkyl-substituted phenoxides, naphthoxides and the like; the residue of an alcohol such as methoxide, ethoxide, propoxide, n-butoxide, t-butoxide and the like; and a hydroxyl group. The salts wherein X" is an acetate, propanoate, oxalate, trichloroacetate, benzoate, benzene sulfonate, p-toluene sulfonate, trifluoromethane sulfonate, methane sulfonate, carbonate, bicarbonate, fluoride, chloride, and phenoxide are preferred. Potassium salts are the most preferred.

All of the reactions discussed above may be advantageously performed in the presence of small amounts of cupric or cuprous ions. A wide range of copper compounds may be used, both cupric and cuprous compounds being usable in accordance with the present invention. The copper compounds used should be stable under the polymerization conditions and it is preferred that the copper compounds be essentially anhydrous. Copper compounds which can be used include cuprous chloride, cupric chloride, cupric acetylacetonate, cuprous acetate, cupric hydroxide, cuprous oxide, cupric oxide, basic cupric carbonate and basic cupric chloride. Although a basic copper compound may be used, it is still necessary to use an at least stoichiometric amount of the sodium or alkaline earth metal carbonate or bicarbonate.

The proportion of the copper compound used is preferably not more than one mole percent based on the total reagents employed; preferably, less than 0.4 mole percent of the copper compound based on the reagents is used. It is generally desirable to employ at least 0.1 mole percent of the copper derivative. Obviously, the optimum amount of the cupric or cuprous ions will depend on the reagents and on the type of the copper derivative employed.

In all of the embodiments of this invention, the total amount of sodium or alkaline earth metal carbonate and/or bicarbonate and of the alkali and alkaline earth metal salt should be such that there is at least one atom or atom equivalent of total alkali and alkaline earth metal for each phenol group, regardless of the anion (carbonate, bicarbonate, carboxylate, etc . . . ). Likewise, where a halophenol is employed, there should be at least one atom or atom equivalent of alkali and alkaline earth metal per mole of halophenol.

Preferably, from about 1 to about 1.2 atoms of sodium for each phenol group are used. An excess of total alkali and alkaline earth metal may be employed. Hence, there may be about 1 to about 1.7 atoms or atom equivalents of alkali and alkaline earth metal per phenol group. While the use of a large excess of alkali and alkaline earth metal may give rise to faster reactions, there is the attendant risk of cleavage of the resulting polymer, particularly when using high temperatures and/or the more active alkali metal salts.

The reaction is carried out by heating a mixture of one or more bisphenols and one or more dihalobenzenoid compounds and/or halophenols at a temperature of from about 100° to about 400° C. The reaction is conducted in the presence of added base as hereinabove defined.

The sodium or alkaline earth metal carbonate or bicarbonate and the organic salts should be anhydrous although, if hydrated salts are employed where the reaction temperature is relatively low, e.g., 100° to 250° C., the water should be removed, e.g., by heating under reduced pressure, prior to reaching the reaction temperature. It is also preferred that the higher alkali metal salt catalysts be anhydrous; however, these latter salts are employed in amounts such that the hydrated forms can also be used.

Where high reaction temperatures (>250° C.) are used, it is not necessary to dehydrate the carbonate or bicarbonate and the organic salts first as any water is driven off rapidly before it can adversely affect the course of the reaction. Optionally, an entraining organic medium such as toluene, xylene, chlorobenzene, and the like can be used to remove the water from the reaction mixture.

Where a bisphenol and dihalobenzenoid compound are employed, they should be used in substantially equimolar amounts when maximum molecular weight is sought. However, a slight excess, up to 5 mole percent of the dihalide or of the diphenol, may be employed, if desired. An excess of one over the other leads to the production of low molecular weight products which can be desirable when the process is directed to making lower molecular weight PAEK, for example, for block polymer formation.

The reaction may be carried out in the presence of an inert solvent, or partially in the absence of a solvent, or in the absence of a solvent.

Preferably, a solvent is employed and is an aliphatic or aromatic sulphoxide or sulphone of the formula

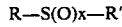

where x is 1 or 2 and R and R' are alkyl or aryl groups and may be the same or different. R and R' may together form a divalent radical. Preferred solvents include dimethyl sulphoxide, dimethyl sulphone, sulpholane (1,1 dioxothiolan), or aromatic sulphones of the formula

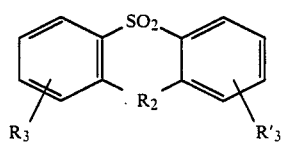

where $R_2$ is a direct link, an oxygen atom or two hydrogen atoms (one attached to each benzene ring) and $R_3$ and $R'_3$, which may be the same or different, are hydrogen atoms or phenyl groups. Examples of such aromatic sulphones include diphenylsulphone, ditolyl sulphone, tolylphenyl sulphone, dibenzothiophene dioxide, phenoxathiin dioxide and 4-phenylsulphonyl biphenyl. Diphenylsulphone is the prefered aromatic sulfone solvent. Other very useful and preferred solvents that may be used, include N,N-dimethyl formamide, N-methyl-2-pyrolidone, N,N-dimethylacetamide, and N-cyclohexyl pyrolidone. In another embodiment, the reaction is started in a relatively low boiling polar aprotic solvent such as dimethyl formamide, dimethylacetamide, dimethyl sulfoxide, N-methylpyrolidone, and the like. Heating at reflux results in the formation of low molecular weight product with attendant precipitation. The solvent may be removed and the low molecular weight product may be advanced if desired, by solid-state polymerization, i.e., by heating to a temperature in the range of from about 200° to about 400° C.; preferably, an inert atmosphere is maintained during this latter step.

The reaction temperature is in the range of from about 100° to about 400° C. and will depend on the nature of the reactants and the solvent, if any, employed. The preferred temperature is above about 130° C. for the preparation of poly(aryl ethers) and above about 250° C. for the preparation of the highly crystalline poly(aryl ether ketones). The reactions are preferably carried out at ambient pressure. However, higher or lower pressure can also be used. The reaction is generally carried out in an inert atmosphere.

For the production of some poly(aryl ether ketones), it may be desirable to commence reaction at one temperature, e.g., between 200° and 250° C. and to increase the temperature as reaction ensues. This is particularly necessary when making high molecular weight polymers having only a low solubility in the solvent. Thus, there it is desirable to increase the temperature progressively to maintain the polymer in solution as its molecular weight increases.

As indicated before, the use of the organic salts as part of the base results in increased rates of polymerization. Depending on the particular case, the observed increase in the rate can be as high as an order of magnitude, and even higher, when compared to rates that are obtained with the previously know systems. Moreover, the use of the organic salts also allows the preparation of polymers with useful molecular weights even in the absence of higher alkali metal compounds or, optionally, in the presence of catalytic amounts of higher alkali metal salts. These useful high molecular weights are unattainable using the previously known systems.

The poly(aryl ethers) and poly(aryl ether ketones) exhibit a reduced viscosity of from about 0.05 to about 5.0, and preferably, from about 0.1 to about 2.0 dl/g as measured in an appropriate solvent at 25° C.

The poly(aryl ethers) and poly(aryl ether ketones) of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The polymers may also include additives such as titanium dioxide; thermal stabilizers, ultraviolet light stabilizers, plasticizers, and the like.

The poly(aryl ethers) and poly(aryl ether ketones) of this invention may be fabricated into any desired shape, i.e., moldings, coatings, films, or fibers. They are particularly desirable for use as electrical insulation for electrical conductors.

EXAMPLES

The following examples serve to give specific illustrations of the practice of this invention but they are not intended in any way to limit the scope of this invention.

CONTROL A

A poly(aryl ether ketone) of the following structure

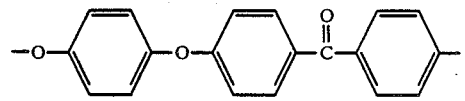

was prepared in the following manner. A 250 ml flask was equipped with a mechanical stainless steel stirrer, nitrogen sparge tube, thermocouple, Dean Stark trap and condenser. The apparatus was charged with 11.01 g (0.100 moles) of hydroquinone;
22.04 g (0.101 moles) of 4,4'-difluorobenzophenone;
10.08 g (0.095 moles) of sodium carbonate;
0.677 g (0.005 moles) of potassium carbonate, and
67.3 g of diphenyl sulfone.

The apparatus was evacuated and filled with nitrogen by means of a Firestone valve connected to the top of the condenser. A flow of nitrogen was begun as 35 ml of xylene were added and the contents of the flask carefully heated by means of a heating mantle and temperature controller to melt the diphenyl sulfone. The reaction mixture was stirred and heated to 200° C. and held for one hour, then held at 250° C. for 15 minutes, and finally at 320° C. for 1.5 hours. The viscous reaction mixture was poured from the reaction flask, allowed to solidify, and ground to a fine powder. The product was refluxed in acetone (700 ml), followed by 5 percent of aqueous hydrochloric acid solution (700 ml); and washed with water (two times using 500 ml of water each time) and acetone (two times using 500 ml each time). The final product was dried in a vacuum oven at 100° C. for approximately 24 hours. The product had a reduced viscosity of 1.19 dl/g (in concentrated sulfuric acid at 1 g/100 ml at 25° C.).

EXAMPLE 1

The procedure of Control A was repeated except that the apparatus was charged with 17.54 g (0.0804 moles) of 4,4'-difluorobenzophenone;
8.81 g (0.080 moles) of hydroquinone;
8.22 g (0.0775 moles) of sodium carbonate;
0.801 g (0.0082 moles) of potassium acetate, and
69 g of diphenyl sulfone.

The reaction time and reduced viscosity of the resultant polymer are listed in Table I.

EXAMPLE 2

Example 1 was repeated with the reaction time shortened to 10 minutes at 320° C. The results are listed in Table I.

EXAMPLE 3

Example 2 was repeated with the reaction time shortened to 7 minutes at 320° C. The results are listed in Table I.

TABLE I

| | Potassium Salt | Ratio of Potassium To Sodium | Reaction Time at 320° C. (min) | Reduced Viscosity[a] (dl/g) |
|---|---|---|---|---|
| Control A | $K_2CO_3$ | 0.053 | 90 | 1.19 |
| Example 1 | $CH_3CO_2K$ | 0.053 | 15 | 1.31 |
| Example 2 | $CH_3CO_2K$ | 0.053 | 10 | 0.91 |
| Example 3 | $CH_3CO_2K$ | 0.053 | 7 | 1.40 |

[a]measurements performed as described in Control A.

CONTROL B

A 500 ml four-neck reaction flask (two slanted side necks) fitted with a mechanical stainless steel stirrer, thermocouple probe, a Claisen arm in one side neck, a stainless steel nitrogen inlet tube in the straight portion of the Claisen arm, and a condenser fitted to the curved arm and connected to a Firestone valve, was charged with 50.19 g (0.23 moles) 4,4'-difluorobenzophenone, (recrystallized from ethanol),
25.33 g (0.23 moles) hydroquinone,
24.80 g (0.2340 moles) sodium carbonate,
0.083 g (0.0006 moles) potassium carbonate (ground dried), and
200.00 g diphenyl sulfone.

The reaction apparatus was evacuated and filled with argon five times by means of the Firestone valve and then a continuous purge with ultra high purity nitrogen was commenced and the connection to the valve was replaced with a bubbler. The reaction mixture was heated with an electric mantle and temperature controller to 200° C., held 30 minutes, heated to 250° C. and held one hour during which time some foaming of the mixture occurred and which was suppressed by increasing the stirrer speed as required. The reaction mixture was then heated to 270° C., held one hour, heated to 290° C., held 30 minutes, and then heated to 320° C. After 140 minutes at 320° C., the reaction was endcapped by adding LiCl (0.15 g, 0.0036 moles) and 1,4-bis(4-fluorobenzoyl)benzene [BFBB] (1.48 g, 0.0046 moles in 5 g of diphenyl sulfone); the reaction temperature was reduced to 300° C. After 30 minutes at 300° C., the reaction mixture was poured into a pan, cooled, and subsequently ground to a fine powder. The powdered reaction mixture was then extracted by refluxing twice in acetone, in 2.5 percent aqueous oxalic acid, in water, and again in acetone and dried overnight at 110°-120° C. in a vacuum oven with a slight air bleed.

Note that this combination of sodium and potassium carbonates is disclosed in U.S. Pat. No. 4,176,222 in which the K/Na ratio is said to be 0.001 to 0.2. For this example, the K/Na ratio is 0.00256.

The reduced viscosity of the polymer, measured on a solution of one gram of polymer in 100 ml concentrated sulfuric acid at 25° C. was 0.60 dl/g. This value indicates that a relatively low molecular weight polymer was obtained.

CONTROL C

This control was performed in a manner similar to that of Control B; based on hydroquinone, 1.02 moles of sodium carbonate and 0.0052 moles of KF (K/Na=0.00255) were used. After 155 minutes at 320° C. and a LiCl/BFBB termination step, a polymer having a reduced viscosity (one gram/100 ml concentrated $H_2SO_4$ at 25° C.) of 0.51 dl/g was obtained.

EXAMPLE 4

The polymerization was performed in a manner similar to that of Control C with potassium acetate in place of potassium fluoride. The amount of base used (relative to hydroquinone) was 1.02 moles of sodium carbonate and 0.0052 moles of potassium acetate (K/Na=0.00255). After 43 minutes at 320° C. and a LiCl/BFBB termination step, a polymer having a reduced viscosity (one gram/100 ml concentrated $H_2SO_4$ at 25° C.) of 1.06 dl/g was obtained.

The difference in molecular weights obtained in Example 4 and in Controls B and C (K/Na ratio being the same) is truly remarkable.

EXAMPLE 5

A 500 ml three-neck reaction flask (two slanted side necks) fitted with a mechanical stainless steel stirrer, thermocouple probe, a Claisen arm in one side neck, a stainless steel nitrogen inlet tube in the straight portion of the Claisen arm, and a condenser fitted to the curved arm and connected to a Firestone valve, was charged with 50.19 g (0.23 moles) 4,4'-difluorobenzophenone,
25.33 g (0.23 moles) hydroquinone,
23.48 g (0.2346 moles) calcium carbonate,
2.26 g (0.023 moles) potassium acetate, and
200.00 g diphenyl sulfone.

The reaction apparatus was evacuated and filled with argon five times by means of the Firestone valve and then a continuous purge with ultra high purity nitrogen was commenced and the connection to the valve was replaced with a bubbler. The reaction mixture was heated with an electric mantle and temperature controller to 200° C., held 30 minutes, heated to 250° C., during which time $CO_2$ evolution commenced, held one hour, heated to 270° C., held one hour, heated to 290° C., held 30 minutes, and then heated to 300° C. After 9 minutes at 300° C., the reaction mixture had become very viscous and after a total of 21 minutes, the viscous mixture had wrapped around the stirrer shaft and the reaction mixture was cooled.

The polymer was isolated as given in previous examples, except using 5 percent HCl in place of the oxalic acid extraction. The reduced viscosity (one percent in concentrated sulfuric acid, at 25° C.) of the polymer was 3.97 dl/g. The polymer solution in sulfuric acid showed no evidence of gel particles for this very high molecular weight polymer.

CONTROL D

The procedure of Control B was repeated using only sodium carbonate (0.2346 moles). After 120 minutes at 320° C. and end-capping with BFBB, a polymer having a reduced viscosity (one gram/100 ml concentrated $H_2SO_4$ at 25° C.) of 0.44 dl/g was obtained.

EXAMPLES 6-9

These examples were performed in a manner similar to that described in Control B. The results are listed in Table II.

TABLE II

Preparation of Poly(aryl ether ketones) Via a Potassium-Free Process

| Example | Moles Based on Hydroquinone | | | Reaction Time at 320° C. (min) | RV (1 g/100 ml conc H$_2$SO$_4$ at 25° C.) dl/g |
|---|---|---|---|---|---|
| | Na$_2$CO$_3$ | NaOCOCH$_3$ | K$_2$CO$_3$ | | |
| 6 | 1.02 | 0.20 | — | 30 | 0.67 |
| | | | | 60 | 1.01 |
| | | | | 90 | 1.32 |
| | | | | final (90)[a] | 1.24 |
| 7 | 1.02 | 0.10 | — | 30 | 0.49 |
| | | | | 48 | 1.17 |
| | | | | final (52)[a] | 1.32 |
| 8 | 1.02 | 0.05 | — | 30 | 0.34 |
| | | | | 60 | 0.76 |
| | | | | final (63)[a] | 0.99 |
| 9 | 1.02 | 0.05 | — | 15 | 0.26 |
| | | | | 30 | 0.40 |
| | | | | 60 | 1.02 |
| | | | | final (63)[b] | 1.25 |

[a]End-capped at times shown and held for an additional 30 minutes at 300° C.
[b]Not end-capped.

EXAMPLE 10

The polymerization was conducted as in Example 7 except with sodium benzoate (0.023 moles, 3.31 g) in place of sodium acetate. Upon reaching the final reaction temperature at 320° C., the reaction mixture was creamy white. After 32 minutes at 320° C., the polymer was end-capped with BFBB. The final polymer reduced viscosity was 1.25 dl/g (one gram/100 ml concentrated H$_2$SO$_4$ at 25° C.).

EXAMPLE 11

The polymerization was repeated as in Example 10 but with less sodium benzoate (0.0115 moles, 1.66 g). After 30 minutes at 320° C., a polymer sample was taken, and after a total of 37 minutes at 320° C., the polymer was end-capped with BFBB. The reduced viscosities were 1.19 dl/g and 1.33 dl/g for the polymer sample and the final polymer, respectively (one gram/100 ml concentrated H$_2$SO$_4$ at 25° C.).

EXAMPLE 12

The polymerization of Example 11 was repeated except that even less sodium benzoate (0.0046 moles, 0.66 g) was used. A polymer sample taken after 35 minutes at 320° C. had a reduced viscosity of 1.54 dl/g. The final polymer sample obtained after end-capping with BFBB had a reduced viscosity of 1.39 dl/g (one gram/100 ml concentrated H$_2$SO$_4$ at 25° C.).

EXAMPLE 13

A 500 ml four-neck reaction flask (two slanted side necks) fitted with a mechanical stainless steel stirrer, thermocouple probe, a Claisen arm in one side neck, a stainless steel nitrogen inlet tube in the straight portion of the Claisen arm, and a condenser fitted to the curved arm and connected to a Firestone valve, was charged with 50.19 g (0.23 moles) 4,4'-difluorobenzophenone (recrystallized from ethanol),
25.33 g (0.23 moles) hydroquinone,
24.87 g (0.2346 moles) sodium carbonate (ground and dried),
1.89 g (0.023 moles, anhydrous reagent) sodium acetate,
0.07 g (0.0012 moles, anhydrous, ground and dried) potassium fluoride, and p0 200.00 g diphenyl sulfone.

The reaction apparatus was evacuated and filled with argon five times by means of the Firestone valve and then a continuous purge with ultra high purity nitrogen was commenced and the connection to the valve was replaced with a bubbler. The reaction mixture was heated with an electric mantle and temperature controller to 200° C., held 30 minutes, heated to 250° C. and held one hour during which time some foaming of the mixture occurred and which was suppressed by increasing the stirrer speed as required. The reaction mixture was then heated to 270° C., held for one hour, heated to 290° C., held 30 minutes, and then heated to 320° C. Within 14 minutes after reaching 320° C. the reaction mass was so viscous that it had wrapped around the stirrer shaft. A total of 100 g diphenyl sulphone was added over 10 minutes to dilute the reaction mixture and the reaction mixture was poured into a pan, cooled, and subsequently ground to a fine powder. The powdered reaction mixture was then extracted by refluxing twice in acetone, in 2.5 percent aqueous oxalic acid, in water, and again in acetone and dried overnight at 110°–120° C. in a vacuum oven with a slight air bleed.

The reduced viscosity measured on a solution of 1 g polymer in 100 ml concentrated sulfuric acid, at 25° C. was 2.06 dl/g.

EXAMPLE 14

The polymerization was conducted essentially as in Example 13 except that the amount of sodium acetate was reduced to 0.98 g (0.012 moles). After 12 minutes at 320° C., 1,4-bis(4-fluorobenzoyl)-benzene [BFBB](1.48 g, 0.0046 moles) along with 35 g diphenyl sulfone were added to the very viscous reaction mixture to end-cap the polymer. The reaction mixture was quenched 10 minutes later and worked up as in Example 13. The reduced viscosity was 2.21 dl/g.

EXAMPLE 15

The polymerization of Example 14 was conducted with potassium carbonate (0.0006 moles, 0.083 g) in place of potassium fluoride. After 12 minutes at 320° C., a reaction sample was taken and after an additional two minutes, the reaction mixture was poured out and cooled. The polymer sample reduced viscosity was 1.45 dl/g and the final polymer reduced viscosity was 1.66 dl/g. The K/Na ratio in this example was 0.0025, essentially the same as in Example 14.

EXAMPLE 16

The polymerization was conducted essentially as in Example 13 except that the amount of potassium fluoride was reduced to 0.0138 g (0.000237 moles). After 30 minutes at 320° C. LiCl (0.10 g, 0.0023 moles) and 5 g diphenyl sulfone were added; after 6 minutes BFBB and 11 g diphenyl sulfone were added as in Example 14 and the reaction temperature was reduced to 300° C. The reaction mixture was quenched after 20 minutes. The results are listed in Table III.

The polymer was compression molded at 400° C. to give a tough film with the following properties:

| | | |
|---|---|---|
| Tensile modulus, psi | 340,000 | ASTM D-638 |
| Tensile strength, psi | 12,400 | ASTM D-638 |
| Yield strength, psi | 12,400 | ASTM D-638 |
| Yield elongation, % | 6.2 | ASTM D-638 |
| Break elongation, % | 27 | ASTM D-638 |
| Pendulum impact, ft-lb/in$^3$ | 225 | ASTM D-256 |

The polymer exhibited a melt flow (400° C., 10P) of 1.5 dg/min. Its melt stability at 400° C. was excellent.

EXAMPLE 17

The polymerization was conducted essentially as in Example 16 except that the amount of sodium acetate was reduced to 0.94 g (0.115 moles). A reaction sample was taken after 15 minutes at 320° C.; after 25 minutes LiCl (0.042 g, 0.001 moles and 5 g diphenyl sulfone were added and the reaction temperature reduced to 300° C. and a second reaction sample was taken. After 5 minutes BFBB and 10 g diphenyl sulfone were added as in Example 14 and an additional 50 g diphenyl sulfone were added to dilute the viscous reaction mixture. The reaction was quenched 25 minutes after the BFBB was added and worked up as in Example 13. The results are shown in Table III.

EXAMPLE 18

The polymerization was conducted essentially as in Example 17 except that a slightly lower amount of potassium fluoride was charged and except that the polymer was not end-capped. A reaction sample was taken after 15 minutes at 320° C.; after 30 minutes the viscous reaction mixture was quenched by pouring it into a pan. The polymer was isolated as in Example 13 and the results are shown in Table III.

TABLE III

Poly(aryl ether ketone) Preparation in the Presence of Sodium Carboxylate and Catalytic Amounts of a Potassium Salt

| Example | Moles (Based on Hydroquinone)[a] NaOCOCH$_3$ | KF | K/Na[b] | Reaction Time at 320° C. (min) | RV[c] |
|---|---|---|---|---|---|
| 16 | 0.10 | 0.00103 | 0.000481 | 30 | 1.10 |
| | | | | final (30)[d] | 1.63 |
| 17 | 0.05 | 0.00103 | 0.000493 | 15 | 0.61 |
| | | | | final (25)[d] | 1.73 |
| 18 | 0.05 | 0.00101 | 0.000483 | 15 | 0.79 |
| | | | | final (30)[e] | 1.53 |

[a]Sodium carbonate, 1.02 moles relative to hydroquinone.
[b]Total sodium from carbonate and carboxylate.
[c]1 g/100 ml. of conc. H$_2$SO$_4$ at 25° C.
[d]End-capped with LiCl/BFBB.
[e]Not end-capped.

EXAMPLE 19

The polymerization was conducted in a manner similar to that of Example 17, except with sodium benzoate (0.0046 moles, 0.66 g) in place of sodium acetate. After 15 minutes at 320° C., a reaction sample was taken, the polymer was end-capped using lithium chloride and BFBB, and quenched 15 minutes later. The reduced viscosity of the polymer sample was 1.29 dl/g and of the final isolated polymer 1.35 dl/g. (1 g/100 ml. concentrated H$_2$SO$_4$ at 25° C.). The K/Na ratio in this example was 0.00050.

EXAMPLE 20

The polymerization of Example 17 was repeated with about half the potassium fluoride (0.000118 moles, 0.0069 g) and the polymer was not end-capped. After 33 minutes at 320° C., the reaction mixture was quenched by pouring it out. The final polymer reduced viscosity was 2.43 dl/g (1 g/100 ml concentrated H$_2$SO$_4$ at 25° C.). The K/Na ratio in this example was 0.000245, about half that in Example 17; and yet the molecular weight was even higher than that obtained in Examples 17 and 18.

EXAMPLE 21

The polymerization was conducted in a manner similar to that of Example 13, with 50.19 g (0.23 moles) 4,4'-difluorobenzophenone,
25.33 g (0.23 moles) hydroquinone,
23.48 g (0.2346 moles) calcium carbonate,
1.89 g (0.023 moles) sodium acetate,
0.13 g (0.0023 moles) potassium fluoride, and
200.00 g diphenyl sulfone.

The reaction mixture was heated as follows: 200° C. for 30 minutes, 250° C. for one hour, 270° C. for one hour, 290° C. for one hour, and then 300° C. After 20 minutes at 300° C., the polymer was end-capped with BFBB (1.48 g) followed by 20 g diphenyl sulfone; after an additional 30 minutes the reaction mixture was quenched and worked-up as in Example 5. The reduced viscosity of the polymer was 1.76 dl/g (1 g/100 ml concentrated H$_2$SO$_4$ at 25° C.).

EXAMPLE 22

The polymerization was conducted in a manner similar to that of Example 13 with 50.19 g (0.23 moles) 4,4'-difluorobenzophenone,
25.33 g (0.23 moles) hydroquinone,
24.87 g (0.2346 moles) sodium carbonate,
1.66 g (0.0115 moles) sodium benzoate,
0.267 g (0.00046 moles) potassium fluoride,
0.2 g (0.002 moles) cuprous chloride, and
200.0 g diphenyl sulfone.

The reaction mixture was purged with an inert atmosphere and heated as follows:
200° C. for 30 minutes,
250° C. for one hour,
270° C. for one hour,
290° C. for 30 minutes, and then at 320° C.

After 25 minutes at 320° C. the reaction mixture was terminated by adding
0.39 g (0.0092 moles) of lithium chloride, and
1.48 g (0.0046 moles) of 1,4-bis(4-fluorobenzoyl)benzene.

After an additional 30 minutes, the polymer mixture was cooled and isolated as in Example 13. The reduced viscosity of the polymer was 1.88 dl/g. (1 g/100 ml in concentrated sulfuric acid, at 25° C.).

What is claimed is:

1. An improved process for preparing poly(aryl ethers) and poly(aryl ether ketones) by the reaction of a mixture of at least one bisphenol and at least one dihalobenzenoid compound, and/or a halophenol, wherein the improvement comprises providing to the reaction, a base which is a combination of an alkaline earth metal carbonate and/or bicarbonate and a potassium, rubidium, or cesium salt of an organic acid or combination of organic salts thereof.

2. The process according to claim 1 wherein the ratio of the total gram atoms of potassium, rubidium or cesium to the total gram equivalents of the alkaline earth metal is from about 0.001 to about 0.5.

3. An improved process for preparing poly(aryl ethers) and poly(aryl ether ketones) by the reaction of a mixture of at least one bisphenol and at least one dihalobenzenoid compound, and/or a halophenol, wherein the improvement comprises providing to the reaction a base which is a combination of an alkaline earth metal carbonate or bicarbonate and a lithium, sodium, or alkaline earth metal salt of an organic acid or combinations of organic salts thereof.

4. A process according to claim 3 wherein the base is a combination of an alkaline earth metal carbonate or bicarbonate and a sodium salt of an organic acid or combination of organic salts thereof.

5. The process according to claim 3 or 4 wherein the amount of lithium, sodium, or alkaline earth metal (organic) salt is from about 0.01 to about 0.5 moles per mole equivalent of alkaline earth metal carbonate or bicarbonate.

6. The process according to claims 1 or 3, wherein the ratio of carbonate and bicarbonate anions to the phenolic groups is about 0.5 and 1.0, respectively.

7. A process according to claims 1 or 3, wherein the organic salt is a salt of an aliphatic linear or branched acid selected from formic, acetic, propionic, butyric, isobutyric,
pentanoic, hexanoic, heptanoic, octanoic, nonanoic, decanoic, 2-methyl-butyric, 3,4-dimethyl-pentanoic, 4,4-dimethyl hexanoic, 2-ethyl-heptanoic, or 3-propyl-5,6-dimethyl nonanoic acid.

8. A process according to claims 1 or 3, wherein the organic salt is a salt of a halosubstituted aliphatic acid selected from monochloro-, dichloro-, or trichloroacetic,
2-chloropropionic, 3,5-dichloroheptanoic, bromacetic, 3-fluorobutyric, or 3,3,3-trichloropropionic acid.

9. A process according to claims 1 or 3, wherein the organic salt is a salt of an aromatic mono- or polynuclear acid selected from benzoic, toluic,
3,4-dimethylbenzoic, 2-chlorobenzoic, 3,4-dichlorobenzoic, 2-bromobenzoic, 2-chloro-4-methylbenzoic, 2-fluoro-3-ethylbenzoic, other alkyl and/or halo-substituted benzoic acids, the naphthalene carboxylic acids, alkyl-substituted naphthalene carboxylic acids such as 3-methyl-naphthalene-1-carboxylic acid, 6-ethyl-naphthalene-2-carboxylic acid, halo-substituted naphthalene carboxylic acids such as 4-chloro-naphthalene-2-carboxylic acid, phenanthrene or anthracene carboxylic acid.

10. A process according to claims 1 or 3, wherein the organic salt is a salt of an arylaliphatic acid selected from
phenylacetic, diphenyl acetic, 1-naphthyl acetic, 2-naphthyl acetic, 4-chlorophenyl acetic, 4-methylphenyl acetic, 3-bromo-1-naphthyl acetic, 4-chloro-2-naphthyl acetic, 3-(6-chloro-1-naphthyl)propionic, 3-(4-ethyl-phenyl)butyric, 3-methyl-4-(2-ethyl-4-chlorophenyl)butyric, 3-phenyl-hexanoic, or 7-phenylnonanoic acid.

11. A process according to claims 1 or 3, wherein the organic salt is a salt of a heterocyclic carboxylic acid selected from
furane-2-carboxylic, furane-3-carboxylic, thiophene-2-carboxylic, thiophene-3-carboxylic, the pyridine, quinoline or isoquinoline carboxylic acids; the alkyl, aryl, or halo-substituted heterocyclic acids selected from 2-methylfurane-3-carboxylic, 4-chloro-pyridine-2-carboxylic, 2-methyl-4-oxazole carboxylic, or 2-propyl-pyrazine-3-carboxylic acid.

12. A process according to claims 1 or 3, wherein the organic salt is a salt of a dicarboxylic acid selected from oxalic, malonic, succinic, adipic, suberic, azelaic, $\alpha$-bromo-glutaric, $\beta,\beta'$-dimethyl-glutaric, $\alpha,\alpha'$-dichlorosuberic, maleic, fumaric, phthalic, isophthalic, terephthalic, naphthalene-1,2-dicarboxylic, naphthalene-2,3-dicarboxylic, naphthalene-1,5; 1,6; 1,7; 1,8; 2,4; 2,5; or 2,6-dicarboxylic, pyridine-2,3-dicarboxylic, or furane-2,3-dicarboxylic acid.

13. A process according to claims 1 or 3, wherein the organic salt is a salt of an aliphatic, aromatic, and heterocyclic phosphonic or phosphinic acid selected from methane sulfonic, ethane sulfonic, propane sulfonic, benzene sulfonic, benzene sulfinic,
1-naphthalene sulfonic,
2-naphthalene sulfonic,
1-naphthalene sulfinic,
1,8-naphthalene disulfonic,
2,6-naphthalene disulfonic,
4-methyl-benzene sulfinic,
p-toluene sulfonic,
3,4-dichloro-benzene sulfonic,
6-chloro-naphthalene-1-sulfonic,
quinoline-2-sulfonic,
4-pyridine sulfonic,
2-thiophene sulfonic,
3-thiophene sulfonic,
3-methyl-2-furane sulfinic, or
3-propyl-2-furane-sulfonic acids.

14. A process according to claims 1 or 3, wherein the organic salt is a salt of an aliphatic, aromatic, and heterocyclic phosphonic or phosphinic acid selected from methane phosphonic, ethane phosphonic,
benzene phosphinic, benzene phosphonic,
1-naphthalene phosphonic,
2-naphthalene phosphonic,
1-naphthalene phosphinic,
1,8-naphthalene diphosphonic,
2,6-naphthalene diphosphonic,
4-methyl-benzene phosphinic,
4-ethyl-benzene phosphonic,
3,4-dichloro-benzene phosphonic,
3,4-dibromobenzene phosphonic,
3-chloro-4-methyl benzene phosphonic,
6-chloro-1-naphthalene phosphonic,
2-quinoline phosphonic,
2-thiophene phosphonic,
3-thiophene phosphonic,
3-thiophene phosphinic,
3-chloro-2-furane phosphinic, or
3-propyl-2-furane phosphonic acids.

15. The process according to claim 1 wherein the potassium, rubidium, or cesium organic salt is a potassium salt.

16. The process according to claims 1 or 2 wherein the organic salt is selected from the group consisting of formate, acetate, propionate, oxalate, benzoate, benzene sulfonate or p-toluene sulfonate.

17. The process according to claims 3 or 4, wherein the organic salt is selected from the group consisting of formate, acetate, propionate, benzoate, benzene sulfonate or p-toluene sulfonate.

18. The process according to claims 3 or 17, wherein the organic salt is an organic salt of sodium.

19. The process according to claim 1, wherein a cupric or a cuprous compound is used in an amount of at least 0.1 mole percent based on the total phenolic and halobenzenoid reagents employed.

20. The process according to claim 19 wherein the copper compound is selected from the group of cuprous chloride, cupric chloride, cupric acetylacetonate, cuprous acetate, cupric hydroxide, cuprous oxide, cupric oxide, basic cupric carbonate, or basic cupric chloride.

* * * * *

UNITED STATES PATENT OFFICE
CERTIFICATE OF CORRECTION

Patent No. 4,774,314  Dated September 27, 1988

Inventor(s) Paul A. Winslow, Donald R. Kelsey, Markus Matzner

It is certified that error appears in the above-identified patent and that said Letters Patent is hereby corrected as shown below:

PATENT

| Column | Line | |
|---|---|---|
| 1 | 66-67 | "In PAEK under..." should read --In 1978, Imperial Chemical Industries PLC(ICI) commercialized a PAEK under...-- |

Signed and Sealed this

Twenty-third Day of May, 1989

Attest:

DONALD J. QUIGG

Attesting Officer  Commissioner of Patents and Trademarks